United States Patent [19]

Black

[11] Patent Number: 5,209,154

[45] Date of Patent: May 11, 1993

[54] DUAL AREA BRAKE ACTUATION PISTON MECHANISM

[75] Inventor: Raymond J. Black, South Bend, Ind.

[73] Assignee: Allied-Signal Inc., Morristown, N.J.

[21] Appl. No.: 830,978

[22] Filed: Feb. 10, 1992

Related U.S. Application Data

[63] Continuation of Ser. No. 610,671, Nov. 8, 1990, abandoned.

[51] Int. Cl.$^5$ .................................. F15B 11/00
[52] U.S. Cl. ........................................ 91/519; 91/517; 92/62; 92/129
[58] Field of Search ............... 91/516–519; 92/62, 150, 151, 152, 129

[56] References Cited

U.S. PATENT DOCUMENTS

| | | | |
|---|---|---|---|
| 2,766,591 | 10/1956 | Fawick | 92/62 |
| 2,868,341 | 1/1959 | Snoy | 92/107 |
| 3,068,841 | 12/1962 | Robbins et al. | 92/151 |
| 3,230,792 | 1/1966 | Kelly et al. | 192/85 AA |
| 3,277,983 | 10/1966 | Jeffries | 188/196 |
| 3,650,364 | 3/1972 | Laing | 91/519 |
| 3,656,411 | 4/1972 | Plester et al. | 92/51 |
| 3,724,606 | 4/1973 | Kobayashi | 188/72.5 |
| 3,773,148 | 11/1973 | Girauldon et al. | 188/72.4 |
| 3,804,212 | 4/1974 | Haraikawa | 188/72.4 |
| 3,817,152 | 6/1974 | Viron | 91/519 |
| 3,830,061 | 8/1974 | Severinsson | 60/533 |
| 3,887,042 | 6/1975 | Ditlinger et al. | 188/71.8 |
| 4,006,669 | 2/1977 | Price | 92/13.1 |
| 4,428,462 | 1/1984 | Warwick et al. | 188/72.4 |
| 4,496,033 | 1/1985 | Hall et al. | 188/347 |
| 4,629,039 | 12/1986 | Imoto et al. | 188/72.1 |
| 4,704,947 | 11/1987 | Schneider | 91/518 |
| 4,713,984 | 12/1987 | Ohkubo | 192/109 F |
| 4,753,136 | 6/1988 | Hayakawa et al. | 74/869 |
| 4,790,211 | 12/1988 | Iwatsuki et al. | 475/221 |
| 4,815,359 | 3/1989 | Black | 92/13.1 |

*Primary Examiner*—Edward K. Look
*Assistant Examiner*—F. Daniel Lopez
*Attorney, Agent, or Firm*—Larry J. Palguta; Leo H. McCormick, Jr.; Robert A. Walsh

[57] ABSTRACT

The dual area brake actuation piston mechanism (10, 110) comprises a piston housing (12, 112) having therein a first bore (30, 130) disposed coaxially about a separate second bore (40, 140). A first piston (50, 150) is disposed within the first bore (30, 130) and extends from the first bore (30, (130) to a piston end (70, 170). A second piston (60, 160) is disposed within the second bore (40, 140) and extends to engage the piston end (70, 170). The bores (30, 40; 130, 140) have first and second bore openings (32, 42; 132, 142) for receiving pressurized fluid which displaces the respective pistons (50, 60; 150, 160). The second bore opening (42, 142) includes a valving mechanism (80, 180) to either restrict or prevent lower fluid pressures from actuating the second piston (60, 160). Once the first piston (50, 150) has been actuated by lower fluid pressures, higher fluid pressure causes the second piston (60, 160) to be displaced against the piston end (70, 170) so that the piston end (70, 170) is displaced conjointly by both pistons (50, 60; 150, 160). The piston mechanism (10, 110) may include an adjuster mechanism (90, 190) located within the housing (12, 112).

22 Claims, 2 Drawing Sheets

DUAL AREA BRAKE ACTUATION PISTON MECHANISM

This is a continuation of abandoned application Ser. No. 07/610,671 filed Nov. 8, 1990, now abandoned.

This invention relates generally to a hydraulic brake actuation piston mechanism, and in particular to a dual area brake actuation piston mechanism for aircraft brake assemblies.

Aircraft disc brake assemblies are conventionally full circle configurations which incorporate a plurality of piston mechanisms in a balanced arrangement about the circle and which operate to move a pressure plate into engagement with a disc brake stack comprised of alternating stationary and rotating disc elements. Prior actuation piston mechanisms conventionally employ a single piston which results in a linear relationship between the disc interface pressure and the brake system pressure. Because of a variation in the manner in which the stationary and rotating disc elements engage one another at higher and lower braking pressures, which results in a "grabbiness" problem due to a high coefficient of friction at lower pressures, it is desirable to provide a brake actuation piston mechanism which will eliminate brake grabbiness at the lower pressures while providing the desired higher braking forces at higher fluid pressures. Such a piston mechanism would also reduce the differential in braking torque resulting from low and high braking pressures typically effected by single area pistons.

The present invention provides solutions to the above problems by providing a dual area brake actuation piston mechanism, comprising a housing having therein first and second bores, the second bore disposed within and coaxial with said first bore, a first piston mechanism disposed in said first bore and extending from the bore to a piston end, a second piston disposed within said second bore and extending to said piston end, and respective first and second bore openings in the housing to permit fluid flow communication with said bores, the second bore opening containing valving means which controls fluid flow into said second bore, so that fluid pressure communicated with said bore openings causes said first piston to displace said piston end and increased fluid pressure causes said second piston to be displaced against said piston end such that the piston end is displaced conjointly by both pistons.

One way of carrying out the invention is described in detail with reference to the drawings which illustrate embodiments in which.

Figure 1:
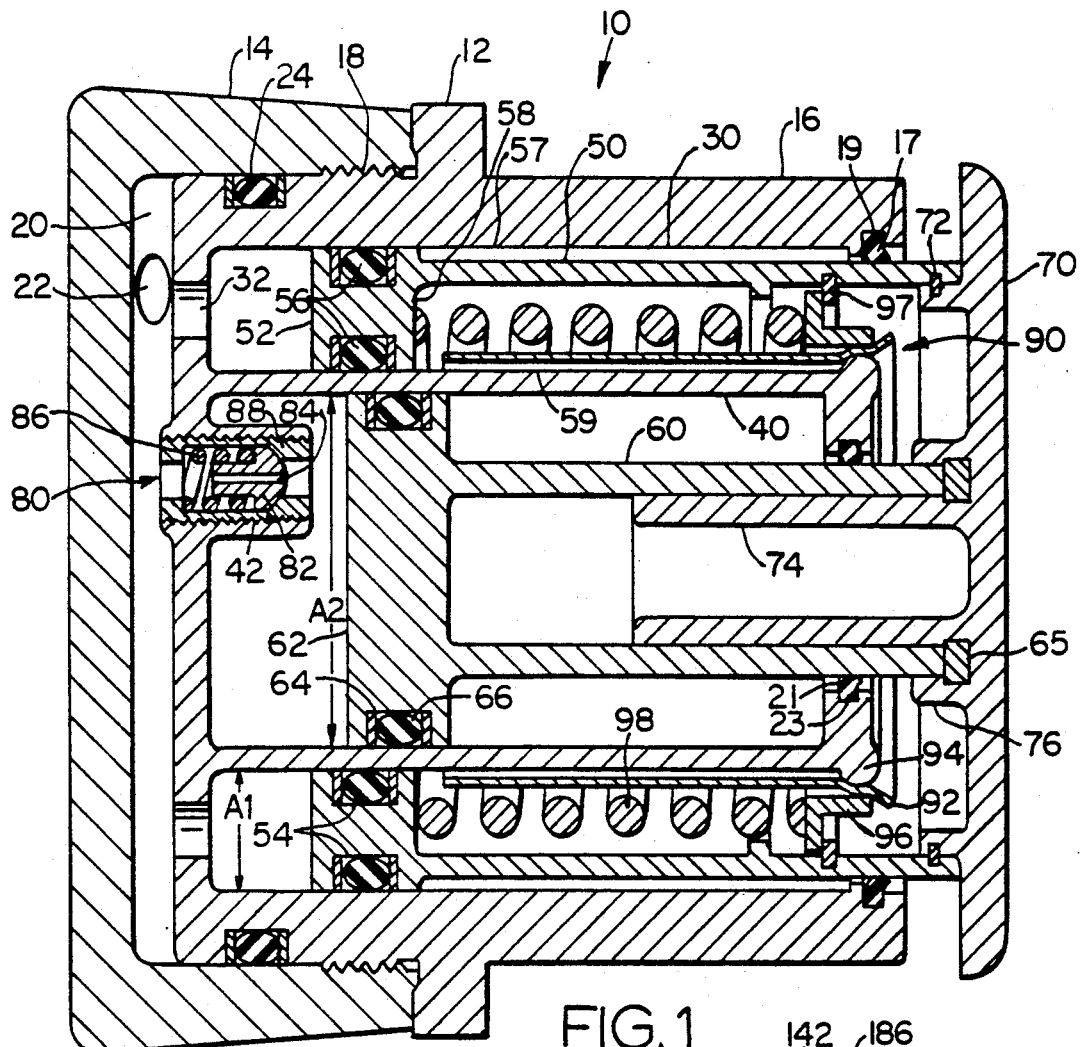
FIG. 1 is a sectional schematic representation of an actuation piston mechanism embodying the present invention.

The dual area brake actuation piston mechanism is designated generally by reference numeral 10 in FIG. 1. Piston housing 12 comprises rear piston housing 14 threadedly engaged with front piston housing 16 by means of threaded connection 18. Rear piston housing 14 defines with front piston housing 16 fluid pressure receiving manifold chamber 20 having fluid passage 22. Chamber 20 is sealed by sealing mechanism 24. Front piston housing 16 comprises first piston bore 30 disposed coaxially about second piston bore 40. Each bore 30, 40 is open ended so that first piston 50 may extend from the first bore and second piston 60 may extend from the second bore. First bore 30 includes first bore opening 32 which communicates with chamber 20. First piston 50 comprises interior piston end 52 having opposing grooves 54 receiving therein sealing means 56 each of which engages radially opposed wall surfaces 57 and 59 of the first bore. First piston 50 extends axially to abut piston end 70. Piston 50 and piston end 70 are connected by ring 72, and piston 50 is engaged by wiper 17 mounted in groove 19 of first housing 16. Second piston 60 comprises interior piston end 62 having groove 64 receiving sealing mechanism 66 which engages the surface of second bore 40. Second piston 60 extends axially to engage piston 70 at end bumper member 65 (which may be metallic, elastic, or otherwise such as a composite material), and is engaged by wiper 21 located within groove 23 of first housing end 16. Piston end 70 includes axial extension 74 which extends interiorly of second piston 60 to engage and be coupled with the second piston. Likewise, Piston end 70 includes short axial extension 76 which engages the outer axial surface of second piston 60. Second bore 40 includes bore opening 42 which communicates with chamber 20. Located within bore opening 42 is valving means or mechanism 80. Valving means 80 comprises valve member 82 having flow restriction orifice 84, valve member 82 being biased by resilient means 86 into engagement with valve seat 88. Valving means 80 restricts fluid flow from chamber 20 through second bore opening 42 and into second bore 40 while permitting increased fluid flow in the reverse direction at and above a predetermined pressure differential which causes valve member 82 to disengage from valve seat 88 during brake release.

An adjuster mechanism indicated generally by reference numeral 90 may be disposed within first bore 30. Adjuster mechanism 90 comprises engagable member 92 and engaging member 94 which comprises a radial abutment of first housing 16. Flange member 96 of mechanism 90 abuts ring 97 attached to first piston 50, and engages engagable member 92 by way of resilient means 98 which extends between flange 96 and radial shoulder 58 of the first piston.

When fluid pressure is transmitted through opening 22 to chamber 20, the fluid pressure may flow freely through first bore opening 32 to first bore 30 wherein the pressure biases first piston 50 outwardly so that piston end 70 engages an associated brake pressure plate (not shown). Fluid pressure received in chamber 20 is also communicated to valving means 80. However, the fluid must flow through restriction orifice 84 to second bore 40, and therefore at lower brake actuation pressures second piston 60 is not actuated effectively by fluid pressure received in chamber 20. Second piston 60 does not, initially, move outwardly with piston end 70. Axial extension 74 moves relative to second piston 60 so that a gap is created between end bumper member 65 and the end of piston 60. However, when increased or higher fluid pressures are received within chamber 20 via opening 22, the higher fluid pressures are effective to actuate second piston 60 and cause displacement of piston 60 so that its end reengages bumper member 65. The higher fluid pressures pass through orifice 84 and act upon second piston 60. Actuation piston mechanism 10 provides at low braking pressures (when brake effectiveness is high) the actuation of first piston 50 via piston area A1 defined by interior piston end 52 located within first bore 30. At higher fluid pressures when the brake effectiveness would typically not be as high, second piston 60 is actuated by fluid pressure acting upon area A2 such that the effective piston area is A1 plus A2 which displaces piston end 70 against the not shown brake pressure plate. Actuation piston mechanism 10 would alleviate brake grabbiness due to high coefficients of friction at lower pressures because a smaller piston area (A1) is utilized, while also providing desired higher piston mechanism actuation forces resulting from the combination of piston areas A1 and A2 at higher braking pressures.

Figure 3A:
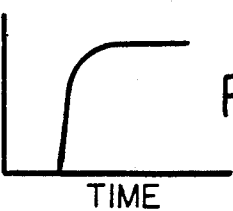
FIG. 3A is a graph illustrating a typical relationship between input pressure $(P-P_o)$ and time.
Figure 3B:
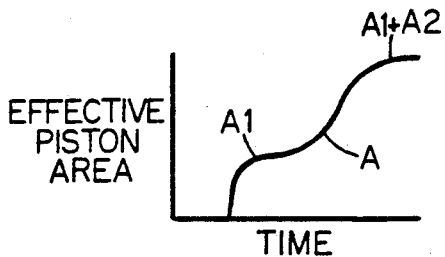
FIG. 3B is a graph illustrating the relationship between the effective piston area and time according to the pressure history shown in FIG. 3A.

FIG. 3B illustrates graphically the relationship between the effective piston area and time. Once the low brake actuation fluid pressure increases in magnitude sufficient to begin displacing the first piston, piston area A1 of piston 50 effects a pressure output against the pressure plate as shown by the first portion A1 of curve A. As higher brake actuation fluid pressures are received and second piston 60 becomes effective, the pressure output is increased according to the portion A1+A2 of curve A. FIG. 3A represents the relationship between the input pressure and time. $P_0$ is the residual pressure present in the piston housing when the piston mechanism is not being actuated.

Figure 2:
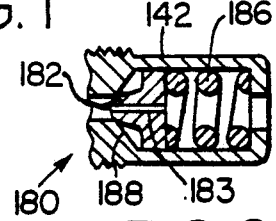
FIG. 2 is a sectional schematic representation of an alternative valving means that may be utilized in the present invention.

FIG. 2 illustrates an alternative embodiment of a valving means or mechanism 180 that may be utilized in the actuation piston mechanism of the present invention. A poppet valve comprising housing 142 receives therein poppet 182 biased by resilient means 186 against valve seat 188. Valving means 180 will keep low fluid pressure from being communicated effectively to second bore 40. However, higher fluid pressures at and above a predetermined pressure level will cause poppet 182 to disengage from valve seat 188 and permit the higher pressures to be communicated to second bore 40. Poppet head 182 includes small openings 183 which will permit fluid to flow back to chamber 20 once poppet head 182 has reengaged valve seat 188 at the predetermined pressure level.

Figure 4:
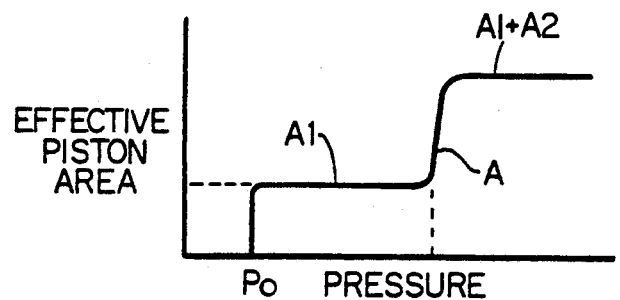
FIG. 4 is a graph illustrating the relationship between effective piston area and pressure input for an actuation piston mechanism utilizing the valving mechanism of FIG. 2.

FIG. 4 illustrates graphically the relationship between the effective piston area and the pressure input in chamber 20 when valving means 180 of FIG. 2 is utilized within actuation piston mechanism 10. After being subjected to relatively low fluid pressures, first piston 50 is displaced such that effective piston area A1 corresponds to a pressure output indicated by portion A1 of graph A. Once valving means 180 has opened at the predetermined pressure level, effective piston area A2 of second piston 60 combines with effective piston area A1 to provide a pressure output indicated by portion A1+A2 of curve A. The main difference between valving means 80 and 180 is that valve means 180 will provide a stepped pressure curve rather than the increase in pressure illustrated in FIG. 3B.

Figure 5:
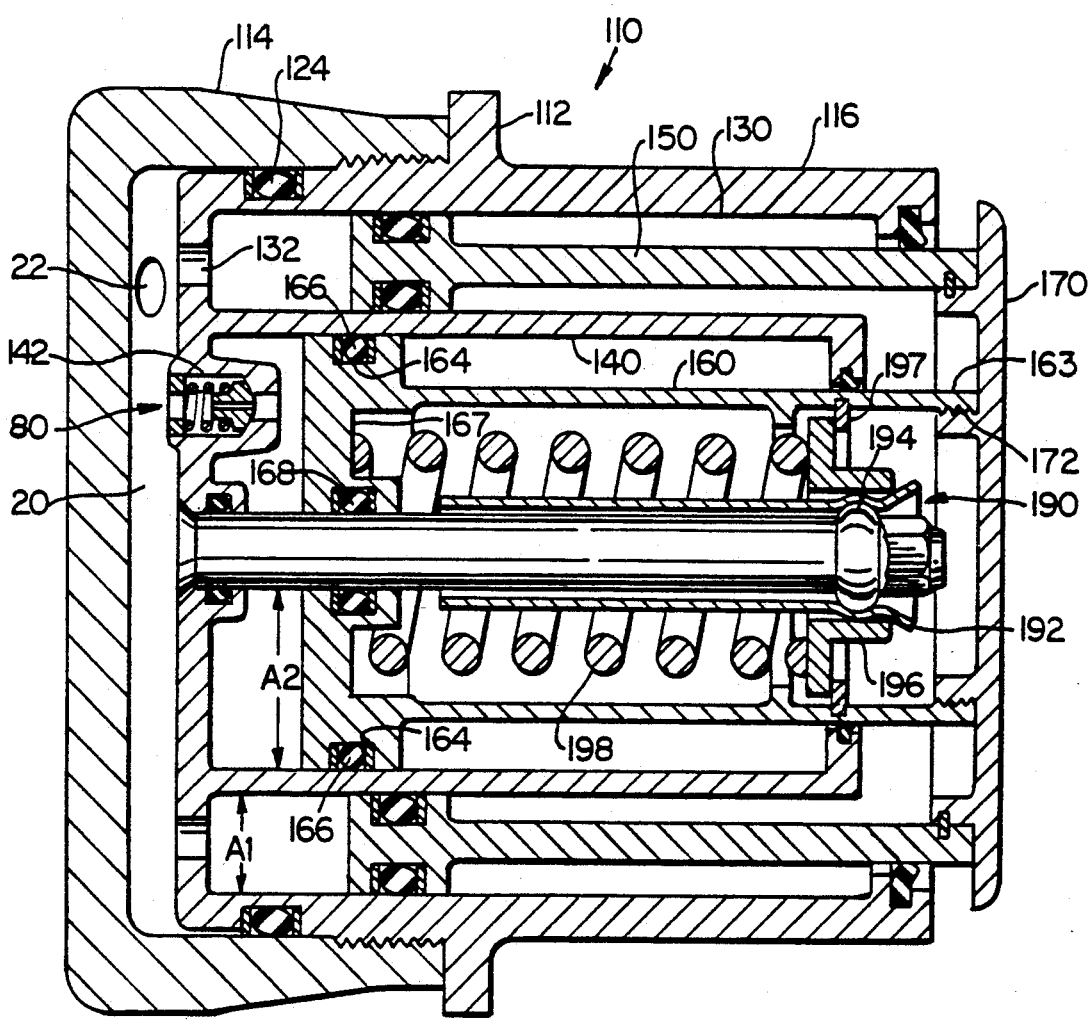
FIG. 5 is an alternative embodiment of the present invention.

FIG. 5 illustrates an alternative embodiment of the present invention. Most similar structure is indicated by the same reference numeral increased by 100. In this embodiment, the adjuster mechanism indicated by reference numeral 190 is disposed within the second piston 160. Housing 112 of piston mechanism 110 includes ball-and-tube extension 194 which is engaged by engagable member 192. Second piston 160 includes ring 197 that serves as a seat for flange 196 biased by resilient means 198. Resilient means 198 is disposed between flange 196 and radial shoulder 167 of the second piston. Second piston 160 includes a second sealing mechanism 168 engaging sealingly ball-and-tube mechanism 194 and separate from sealing mechanism 166 disposed within groove 164. Second piston 160 also includes threaded end 163 which engages threads 172 of piston end 170, so that piston end 170 does not move relative to second piston 160. Second piston bore 140 receives fluid pressure via valving means 80. Mechanism 110 operates similar to the mechanism of FIG. 1 and as represented by the graphs of FIGS. 3A and 3B. Alternatively, mechanism 110 may include the valving means or mechanism 180 illustrated in FIG. 2 rather than valving means 80.

I claim:

1. A dual area brake actuation piston mechanism, comprising a housing having therein first and second bores, the second bore disposed within and coaxial with said first bore, a first piston disposed in said first bore and extending from the bore to a piston end, a second piston disposed within said second bore and extending to said piston end, respective first and second bore openings in the housing to permit fluid flow communication with said bores, and the second bore opening containing valving means which controls fluid flow into said second bore wherein said valving means comprises poppet valve means which opens at a predetermined fluid pressure to permit fluid pressure through said second bore opening to said second bore, so that fluid pressure communicated with said bore openings causes said first piston to displace said piston end and increased fluid pressure causes said second piston to be displaced against said piston end such that the piston end is displaced conjointly by both pistons.

2. The piston mechanism in accordance with claim 1, wherein the poppet valve means comprises a poppet head engaging a poppet valve seat, the poppet head biased by resilient means disposed within the valving member.

3. A dual area brake actuation piston mechanism, comprising a housing having therein first and second bores, the second bore disposed within and coaxial with said first bore, a first piston disposed in said first bore and extending from the bore to a piston end, a second piston disposed within said second bore and extending to said piston end, respective first and second bore openings in the housing to permit fluid flow communication with said bores, the second bore opening containing valving means which controls fluid flow into said second bore wherein said valving means comprises poppet valve means which opens at a predetermined fluid pressure to permit fluid pressure through said second bore opening to said second bore, and an adjuster mechanism disposed within the second bore, so that fluid pressure communicated with said bore openings causes said first piston to displace said piston end and increased fluid pressure causes said second piston to be displaced against said piston end such that the piston end is displaced conjointly by both pistons.

4. A dual area brake actuation piston mechanism, comprising a housing defining separately therein first and second bores substantially isolated from one another, the second bore disposed within and coaxial with said first bore, a first piston disposed in said first bore and extending exteriorly from the housing and first bore to a piston end, a second piston disposed within said second bore and extending exteriorly to said piston end, the pistons each attached fixedly to the piston end, a manifold chamber defined only by the housing and communicating with respective first and second bore openings in the housing to permit fluid flow communication with said bores, and the second bore opening containing valving means which controls fluid flow into said second bore, so that fluid pressure communicated with said bore openings causes said first piston to displace said piston end and increased fluid pressure causes said second piston to be displaced against said piston end such that the piston end is displaced conjointly by both pistons.

5. The piston mechanism in accordance with claim 4, wherein said valving means comprises a one-way flow restrictor which restricts fluid flow into said second bore.

6. The piston mechanism in accordance with claim 5, wherein the one-way flow restrictor comprises a valve member having a through opening, the valve member biased by resilient means against a valve seat.

7. The piston mechanism in accordance with claim 6, wherein a flow of fluid from said second bore can cause said valve member to be displaced from said valve seat and permit increased fluid flow from said second bore.

8. The piston mechanism in accordance with claim 4, wherein the first piston comprises an interior piston end having radially opposed sealing means engaging opposing surfaces of said first bore.

9. The piston mechanism in accordance with claim 4, further comprising an adjuster mechanism disposed within the second bore.

10. The piston mechanism in accordance with claim 9, wherein the adjuster mechanism comprises an engagable member and an engaging member, the engagable member biased by resilient means into engagement with the engaging member, and the engagable member connected with said second piston.

11. The piston mechanism in accordance with claim 10, wherein the housing includes a radial abutment which comprises the engaging member.

12. The piston mechanism in accordance with claim 11, wherein the adjuster mechanism includes a flange member, the flange member engaged by the resilient means and by the engagable member.

13. The piston mechanism in accordance with claim 9, wherein said valving means comprises a one-way flow restrictor which restricts fluid flow into said second bore.

14. A dual area brake actuation piston mechanism, comprising a housing defining separately therein first and second bores substantially isolated from one another, the second bore disposed within and coaxial with said first bore, a first piston disposed in said first bore and extending exteriorly from the housing and first bore to a piston end, a second piston disposed within said second bore and extending exteriorly to said piston end, the piston end including an axial extension extending into the second bore and slidingly engaging an axial extension of the second piston, the extensions engaging so as to permit the passage of atmosphere therepast, a manifold chamber defined only by the housing and communicating with respective first and second bore openings in the housing to permit fluid flow communication with said bores, and the second bore opening containing valving means which controls fluid flow into said second bore, so that fluid pressure communicated with said bore openings causes said first piston to displace said piston end and increased fluid pressure causes said second piston to be displaced against said piston end such that the piston end is displaced conjointly by both pistons.

15. The piston mechanism in accordance with claim 14, wherein said valving means comprises a one-way flow restrictor which restricts fluid flow into said second bore.

16. The piston mechanism in accordance with claim 15, wherein the one-way flow restrictor comprises a valve member having a through opening, the valve member biased by resilient means against a valve seat.

17. The piston mechanism in accordance with claim 16, wherein a flow of fluid from said second bore can cause said valve member to be displaced from said valve seat and permit increased fluid flow from said second bore.

18. The piston mechanism in accordance with claim 14, further comprising an adjuster mechanism disposed within the first bore.

19. The piston mechanism in accordance with claim 18, wherein the adjuster mechanism comprises an engagable member and an engaging member, the engagable member biased by resilient means into engagement with the engaging member, and the engagable member connected with said first piston.

20. The piston mechanism in accordance with claim 19, wherein the housing includes a radial abutment which comprises the engaging member.

21. The piston mechanism in accordance with claim 20, wherein the adjuster mechanism includes a flange member, the flange member engaged by the resilient means and by the engagable member.

22. The piston mechanism in accordance with claim 14, wherein the first piston comprises an interior piston end having radially opposed sealing means engaging opposing surfaces of said first bore.

* * * * *